(12) United States Patent
Inuzuka et al.

(10) Patent No.: US 10,889,935 B2
(45) Date of Patent: Jan. 12, 2021

(54) DYEING METHOD AND DYEING APPARATUS

(71) Applicants: NIDEK CO., LTD., Gamagori (JP); SHIZUOKA PREFECTURAL GOVERNMENT, Shizuoka (JP)

(72) Inventors: Minoru Inuzuka, Nishio (JP); Hiroyasu Ueta, Kakegawa (JP); Hiroyasu Atsumi, Hamamatsu (JP)

(73) Assignees: NIDEK CO., LTD., Gamagori (JP); SHIZUOKA PREFECTURAL GOVERNMENT, Shizuoka (JP)

( * ) Notice: Subject to any disclaimer, the term of this patent is extended or adjusted under 35 U.S.C. 154(b) by 377 days.

(21) Appl. No.: 15/861,136

(22) Filed: Jan. 3, 2018

(65) Prior Publication Data

US 2018/0127918 A1 May 10, 2018

Related U.S. Application Data

(62) Division of application No. 13/490,805, filed on Jun. 7, 2012, now abandoned.

(30) Foreign Application Priority Data

Jun. 9, 2011 (JP) .................. 2011-128862
Jun. 4, 2012 (JP) .................. 2012-126739

(51) Int. Cl.
 *D06P 5/20* (2006.01)
 *B23K 26/03* (2006.01)
 (Continued)

(52) U.S. Cl.
 CPC .......... *D06P 5/2005* (2013.01); *B23K 26/034* (2013.01); *B23K 26/082* (2015.10);
 (Continued)

(58) Field of Classification Search
 CPC ................ B23K 26/034; B23K 26/082; B29D 11/00009; B29D 11/00865;
 (Continued)

(56) References Cited

U.S. PATENT DOCUMENTS

| 4,278,867 A | 7/1981 | Tan |
| 5,147,585 A | 9/1992 | Blum |

(Continued)

FOREIGN PATENT DOCUMENTS

| EP | 0 610 141 A1 | 8/1994 |
| EP | 2 261 419 A1 | 12/2010 |

(Continued)

OTHER PUBLICATIONS

Apr. 6, 2016 U.S. Office Action Issued in U.S. Appl. No. 13/490,805.

(Continued)

*Primary Examiner* — Tu B Hoang
*Assistant Examiner* — Vy T Nguyen
(74) *Attorney, Agent, or Firm* — Oliff PLC

(57) ABSTRACT

A dyeing method in which a transparent resin body having a surface applied with a dye is heated to fix the dye to the transparent resin body comprises a heating step of irradiating a laser beam having a wavelength less likely to be absorbed by the dye toward the transparent resin body applied with the dye on the surface while relatively scanning the laser beam with respect to the transparent resin body to heat a to-be-dyed region of the transparent resin body to fix the dye, wherein the laser beam is irradiation to heat by changing a laser beam irradiating condition with respect to a portion of the transparent resin body to be heated so that a heating temperature on the transparent resin body by irradiation of the laser beam is substantially equal throughout an entire area of the to-be-dyed region.

14 Claims, 5 Drawing Sheets

(51) Int. Cl.
*B23K 26/082* (2014.01)
*B29D 11/00* (2006.01)
*D06P 5/28* (2006.01)
*G02B 1/12* (2006.01)

(52) U.S. Cl.
CPC ........ *B29D 11/00865* (2013.01); *D06P 5/004* (2013.01); *D06P 5/005* (2013.01); *D06P 5/2077* (2013.01); *G02B 1/12* (2013.01)

(58) Field of Classification Search
CPC .... B29D 11/00903; D06P 5/004; D06P 5/005; D06P 5/2005; D06P 5/2077; G02B 1/12
USPC ............. 219/121.62, 121.6, 121.68, 121.69; 156/272.8; 430/3; 347/224; 8/444; 118/712; 264/482; 425/174; 372/9; 503/201; 428/58
See application file for complete search history.

(56) References Cited

U.S. PATENT DOCUMENTS

| | | | |
|---|---|---|---|
| 5,359,872 A * | 11/1994 | Nashiki | B21D 5/00 72/16.1 |
| 5,560,751 A | 10/1996 | Hoshiyama | |
| 5,820,673 A | 10/1998 | Sentilles et al. | |
| 5,891,602 A | 4/1999 | Neumann | |
| 6,027,850 A | 2/2000 | Kawakami et al. | |
| 6,217,695 B1 | 4/2001 | Goldberg et al. | |
| 6,245,397 B1 | 6/2001 | Watanabe et al. | |
| 6,455,807 B1 | 9/2002 | Scott | |
| 6,528,758 B2 * | 3/2003 | Shaffer | D06Q 1/00 219/121.68 |
| 6,685,868 B2 | 2/2004 | Costin | |
| 6,736,863 B2 | 5/2004 | Inagaki et al. | |
| 6,911,055 B2 | 6/2005 | Baillet | |
| 7,043,330 B2 | 5/2006 | Toyserkani et al. | |
| 7,422,610 B2 | 9/2008 | Kubodera et al. | |
| 7,477,278 B2 | 1/2009 | Gore et al. | |
| 2004/0118157 A1 | 6/2004 | Borek et al. | |
| 2004/0265572 A1 | 12/2004 | Baillet | |
| 2005/0061424 A1 | 3/2005 | Ackerman et al. | |
| 2008/0111877 A1 | 5/2008 | Heyse et al. | |
| 2009/0075816 A1 * | 3/2009 | Kawahara | B41J 2/471 503/201 |
| 2010/0028558 A1 | 2/2010 | Ozawa et al. | |
| 2010/0047380 A1 | 2/2010 | Widman et al. | |
| 2011/0018175 A1 * | 1/2011 | Inuzuka | D06P 5/20 264/482 |
| 2012/0217228 A1 | 8/2012 | Kitagawa et al. | |
| 2013/0006565 A1 * | 1/2013 | Matsumoto | B23K 31/125 702/82 |

FOREIGN PATENT DOCUMENTS

| | | |
|---|---|---|
| JP | 59-106589 A | 6/1984 |
| JP | H08-305263 A | 11/1996 |
| JP | 2001-215306 A | 8/2001 |
| JP | 2008-012869 A | 1/2008 |
| JP | 2009-244515 A | 10/2009 |
| JP | 2010-047789 A | 3/2010 |
| WO | 2009/122930 | 10/2009 |

OTHER PUBLICATIONS

Feb. 24, 2016 Office Action issued in Japanese Patent Application No. 2012-126739.
Oct. 27, 2016 Office Action issued in U.S. Appl. No. 13/490,805.
Mar. 17, 2017 Office Action Issued in U.S Appl. No. 13/490,805.
Sep. 5, 2017 Office Action Issued in U.S. Appl. No. 13/490,805.
Apr. 24, 2015 Office Action issued in U.S. Appl. No. 13/490,805.
Sep. 21, 2015 Office Action issued in U.S. Appl. No. 13/490,805.

* cited by examiner

DYEING METHOD AND DYEING APPARATUS

CROSS-REFERENCE TO RELATED APPLICATIONS

This application is a divisional of application Ser. No. 13/490,805 filed Jun. 7, 2012, and claims the benefit Japanese Patent Applications Nos. 2011-128862, filed Jun. 9, 2011 and 2012-126739, filed Jun. 4, 2012. The entire disclosures of the prior applications are hereby incorporated by reference in their entirety.

BACKGROUND OF THE INVENTION

Field of the Invention

The present invention relates to a method of dyeing transparent resin, especially, a plastic lens, by using a laser beam, and a dyeing apparatus for use in the method.

Related Art

As a method of dyeing transparent resin such as a plastic lens, there is conventionally known a method of dyeing a lens by dipping or immersing the lens in a dye solution for a predetermined time (a dipping dyeing method). This method is conventionally used but has disadvantages such as poor working conditions and difficulty in dyeing a high-refractive lens. Therefore, the present applicant proposed a dyeing method achieved by applying (outputting) dyeing inks containing sublimable dyes to a base body such as paper by use of an inkjet printer, placing this base body out of contact with a lens, sublimating the sublimable dye toward the lens (hereinafter, referred to as a vapor deposition transfer dyeing method) (see Patent Document 1, for example). In this method, the lens is entirely heated in an oven to fix the dyes to a lens surface.

According to this vapor deposition transfer dyeing method, a lens may turn yellow when a heating temperature needed for fixation is high. A method to solve the problem is proposed in which a lens surface is partially heated by a laser beam to fix dyes (see Patent Document 2).

RELATED ART DOCUMENTS

Patent Documents

Patent Document 1: JP-A-2001-215306
Patent Document 2: JP-A-2009-244515

SUMMARY OF INVENTION

Problems to be Solved by the Invention

However, it is found that the dyeing method using a laser disclosed in Patent Document 2 in which the entire lens is not heated to high temperatures could reduce the occurrence of yellow discoloration, but is apt to cause a new problem with irregular coloring.

The present invention has been made to solve the above problems and has a purpose to provide a dyeing method and a dyeing apparatus using a laser beam capable of reducing the occurrence of irregular coloring and adequately dyeing transparent resin such as a plastic lens.

Means of Solving the Problems

To achieve the above purpose, one aspect of the invention provides a dyeing method in which a transparent resin body having a surface applied with a dye is heated to fix the dye to the transparent resin body, wherein the method comprises a heating step of irradiating a laser beam having a wavelength less likely to be absorbed by the dye toward the transparent resin body applied with the dye on the surface while relatively scanning the laser beam with respect to the transparent resin body to heat a to-be-dyed region of the transparent resin body to fix the dye, wherein the laser beam is irradiation to heat by changing a laser beam irradiating condition with respect to a portion of the transparent resin body to be heated so that a heating temperature on the transparent resin body by irradiation of the laser beam is substantially equal throughout an entire area of the to-be-dyed region.

Another aspect of the present invention provides a dyeing apparatus in which a transparent resin body having a surface applied with a dye is heated to fix the dye to the transparent resin body, wherein the apparatus includes: a laser beam irradiation part for irradiating a laser beam having a wavelength less likely to be absorbed by the dye toward the transparent resin body; a scan part for relatively scanning the laser beam irradiated by the laser beam irradiation part with respect to the transparent resin body; and a controller for controlling irradiation of the laser beam by changing a laser beam irradiating condition with respect to a portion of the transparent resin body to be heated so that a heating temperature on the transparent resin body by irradiation of the laser beam is substantially equal throughout an entire area of the to-be-dyed region while the laser beam is being relatively scanned by the scan part with respect to the to-be-dyed region of the transparent resin body.

Effects of the Invention

According to the invention, it is possible to appropriately dye a transparent resin body such as a plastic lens.

DESCRIPTION OF EMBODIMENTS

Figure 1:
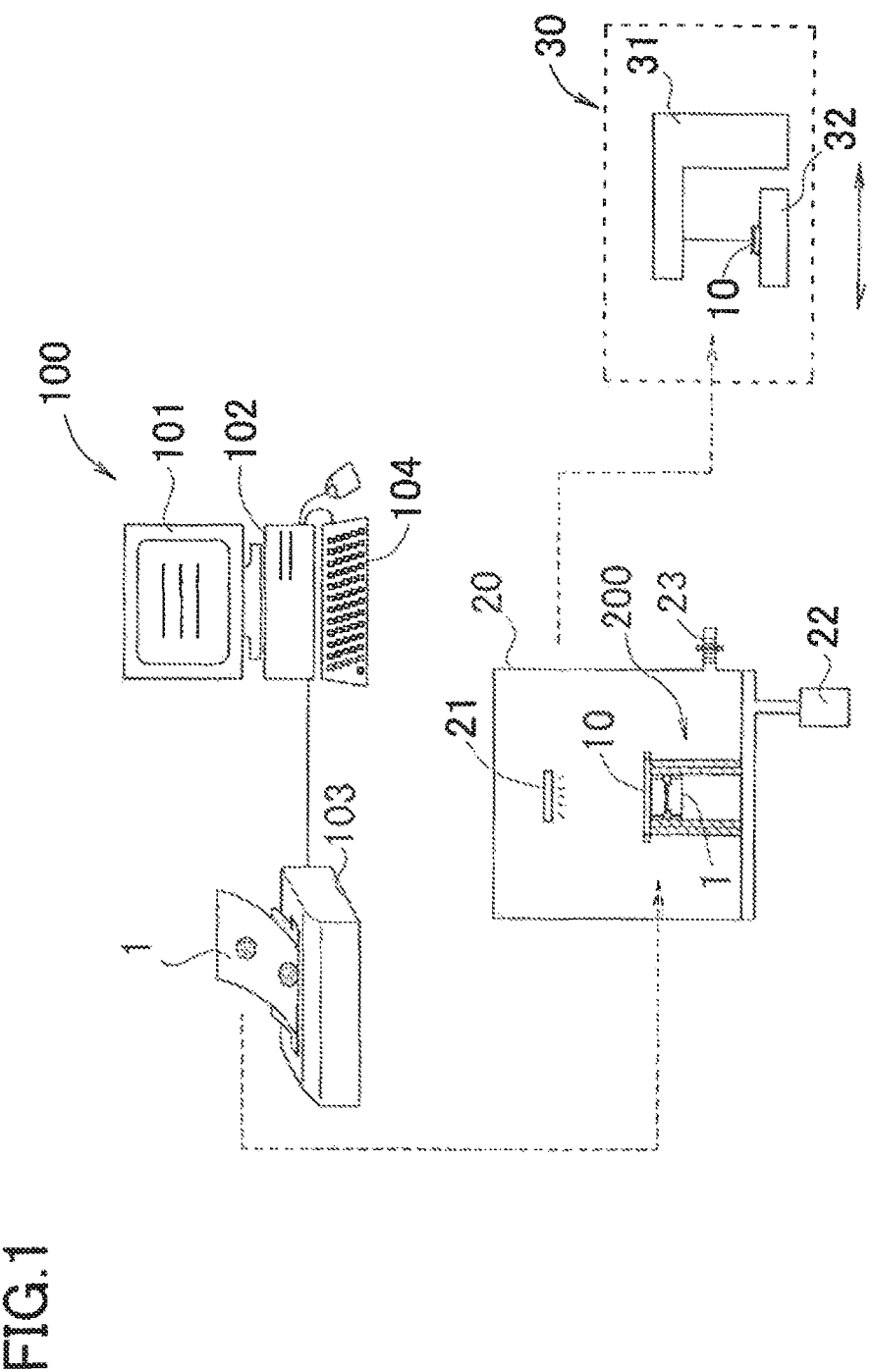
FIG. 1 is a schematic configuration view of a dyeing system in a preferred embodiment.
Figure 2:
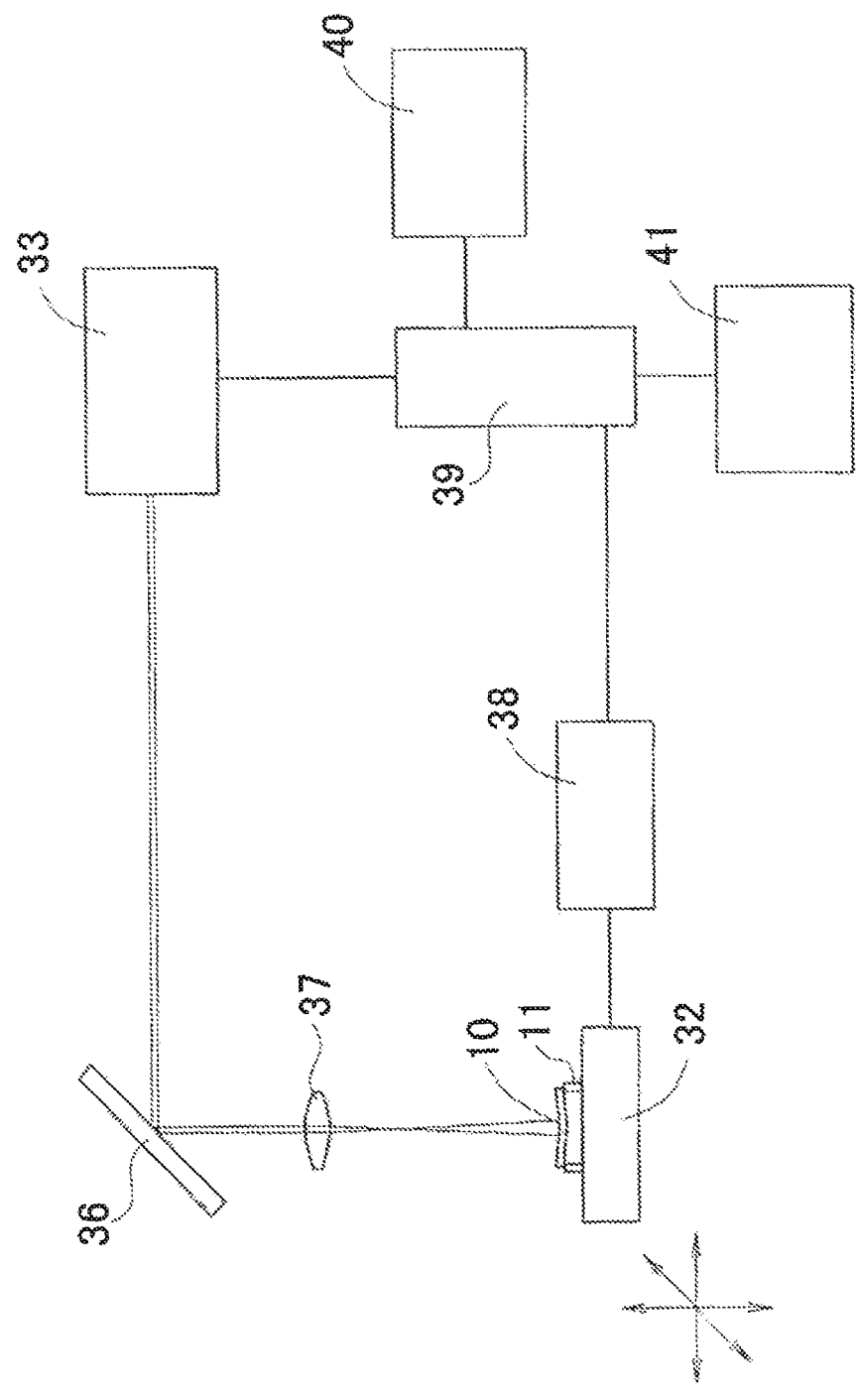
FIG. 2 is a block diagram showing a schematic configuration of a dyeing apparatus used in the embodiment.

A detailed description of a preferred embodiment of the present invention will now be given referring to the accompanying drawings. FIG. 1 is a schematic view of a dyeing system for use in a dyeing method using a laser beam according to the present invention. FIG. 2 is a diagram showing a schematic configuration of a dyeing apparatus.

The dyeing system includes a dyeing base body creating device 100 for creating a dyeing base body, a vacuum vapor deposition transfer machine 20 for depositing (transferring) sublimable dyes applied on the base body to a plastic lens 10 which is an object to be dyed (a plastic lens is used as transparent resin in the present embodiment), and a dyeing apparatus 30 to irradiate a laser beam to the plastic lens 10 deposited with the sublimable dyes, thereby dyeing the lens 10.

The dyeing base body creating device 100 includes a monitor 101, a personal computer (PC) 102, an inkjet printer 103, and others. Numeral 104 denotes an operation unit for operating the PC, such as a keyboard, a mouse, and others. The PC 102 is used to execute a dyeing-base-body creating program stored in a hard disk to output a dyeing base body 1 from the inkjet printer 103. In the hard disk of the PC 102, there are stored not only the program of a dyeing-base-body creating software to create a base body to be used for dyeing a plastic lens but also various base material information of plastic lenses, color data of dyeing inks to be applied to a base body, and others.

The dyeing base body 1 is created in a manner that a medium such as paper usable in the inkjet printer 103 is applied (outputted) with dyeing inks in a predetermined shape. It is to be noted that this medium used herein has a back side (a surface not subjected to printing) being entirely colored in black in order to increase heat absorption efficiency of the base body 1.

The dyeing inks used in the inkjet printer 103 include at least three color inks, i.e., red, blue, and yellow inks. The dye contained in each dying ink needs to be sublimable and resistant to heat generated during sublimation. Furthermore, after the dyes are deposited on the plastic lens, the plastic lens has to be subjected to a color developing work to fix the dyes on the plastic lens without irregular coloring. In consideration of the above points, preferable dyes to be used are sublimable quinophthalone dyes or sublimable anthraquinone dyes.

The vacuum vapor deposition transfer machine 20 shown in FIG. 1 is provided with an open/close door not shown to take in and out the plastic lens 10, the aforementioned base body 1, and others. In an upper section of the machine 20, a heating lamp 21 is placed as a heating source to heat the base body 1 to thereby sublimate the dyes. The heating lamp 21 used in the present embodiment is a halogen lamp, but may be any other type if only it can heat the base body 1 without contact therewith. On a bottom of the machine 20, a dyeing jig 200 is placed. The plastic lens 10 and the base body 1 are set in this jig 200. Numeral 22 is a rotary pump to be used for creating an almost vacuum in the vacuum vapor deposition transfer machine 20. Numeral 23 is a leak valve, which is opened to take outside air into the vacuum vapor deposition transfer machine 20 whose inside is in an almost vacuum state for returning the inside to atmospheric pressure. The dyeing jig 200 holds the lens 10 (a surface to be dyed) and the base body 1 (an ink applied surface) so that they face each other in non-contact relation.

The material of the plastic lens 10 used herein is selectable from polycarbonate resin (e.g., diethylene glycol bisallyl carbonate polymer (CR-39)), polyurethane resin, allyl resin (e.g., allyl diglycol carbonate and its copolymer, diallyl phthalate and its copolymer), fumaric acid resin (e.g., benzyl fumarate copolymer), styrene resin, polymethyl acrylate resin, fibrous resin (e.g., cellulose propionate), high refractive materials such as thiourethane resin and thioepoxy resin, and other high refractive materials that have been heretofore considered inferior in dyeability. Furthermore, a plastic lens having a to-be-dyed surface coated with a predetermined coating such as hard coating may also be used. In the case of a lens applied with coating, its lens surface can be dyed by depositing (applying) the dyes on a coating layer.

The dyeing apparatus 30 is used to heat the plastic lens applied thereon with the sublimable dyes at a predetermined temperature by irradiation of a laser beam to fix and develop the dyes.

FIG. 2 is a schematic diagram showing a configuration of the dyeing apparatus 30. The dyeing apparatus 30 includes a main unit 31 arranged to irradiate a laser beam and a movable stage 32. The main unit 31 includes a laser source 33 that emits a laser beam having a predetermined wavelength, a reflection mirror 36, a lens 37, the movable stage 32, a drive mechanism 38, a controller 39, a control part 40, a storage part 41, and others.

The laser source 33 emits a laser beam having a wavelength in an infrared region. Although the present embodiment uses a light source that emits a $CO_2$ laser beam of a wavelength of 10.2 to 10.8 µm, any types of light source may be used as long as they emit a laser beam having a wavelength in an infrared region absorbable by a base material of a transparent resin body (a plastic lens in this embodiment) or in an ultraviolet region (including near-ultraviolet region). Furthermore, an infrared absorbent or an ultraviolet absorbent may be applied in advance to a lens in addition to the dyes, so that the absorbent absorbs a laser beam to heat the base material. In the case of using the absorbent, it is preferable to apply the dyes and the absorbent in this order to the base material.

The laser beam emitted from the laser source 33 is deflected by the reflection mirror 36 and then passes through the lens 37 to converge. In the present embodiment, a laser beam having a diameter of about 3.8 mm is emitted from the laser source. In the present embodiment, the laser beam having passed through the lens 37 is defocused so that the diameter becomes in a range from about 10 mm to 35 mm on the surface of the plastic lens 10. The diameter of the laser beam defocused on the plastic lens is not limited to the above range and may be appropriately determined in consideration of productivity and irradiation energy. For instance, the spot diameter of the laser beam on the plastic lens is preferable not less than 5 mm and not more than 50 mm and more preferable not less than 10 mm and not more than 40 mm. Furthermore, a cylindrical lens or the like may be used to shape a laser beam into a linear beam.

In a position on which the laser beam will be defocused, the movable stage 32 is placed so as to be movable up, down, forward, backward, leftward, and rightward (in horizontal direction and vertical direction). This stage 32 is moved by activation of the drive mechanism 38. A moving amount and a moving direction of the movable stage 32 are constantly detected by a detection device not shown. Drive control of the drive mechanism 38 is conducted by the controller 39. Control information thereof (a moving direction and a moving speed) is set by the control part (a condition setting part) 40 provided with switches not shown. A holder 11 is fixedly placed on the movable stage 32. The plastic lens 10 on which the sublimable dyes are deposited is put on the holder 11 so that a deposition surface (a surface to be dyed) of the lens 10 faces upward. Since the holder 11 is fixed on the movable stage 32, their positional relationship is evident beforehand. Accordingly, even when the movable stage 32 is moved while the plastic lens is set on the holder 11, the controller 39 can constantly detect an irradiation position of a laser beam with respect to the plastic lens.

The control part 40 can also set the output power of a laser beam (laser power), the moving speed of the movable stage, and others. The storage part 41 stores in advance identification information of various plastic lenses and setting information in individual association with the lens identification information such as laser beam irradiating conditions (e.g., output power condition and scanning speed condition based on a scanning position) needed to appropriately dye various types of plastic lenses. When the plastic lens 10 is to be dyed by use of the dyeing apparatus 30, the kind (identification information) of a plastic lens to be dyed is selected with the control part 40. The controller 39 reads or retrieves the setting information (the laser beam irradiating condition) associated with the selected identification information from the storage part 41, and controls the laser source 33 and the drive mechanism 38 based on the read setting information.

The inventors found, as a result of their diligent studies, that in the case where a plastic lens has different thicknesses between a lens peripheral region and a central region, such as a positive lens and a negative lens, when the entire area (a surface to be dyed) of such a plastic lens on which dyes are deposited is subjected to irradiation of a laser beam under a constant power condition without taking into account different thicknesses between the regions, color unevenness is apt to occur. Due to such a phenomenon, heat generated by the laser beam is less likely to diffuse in a thin portion and thus the dyes are liable to resublime, so that the dyes could not sufficiently be fixed to the lens surface. It is accordingly necessary to set the laser power condition over the entire area of a lens to not more than a temperature at which the dyes sublime, while ensuring a fixation temperature needed to physically or chemically bind the dyes deposited on the lens to a lens material. For this reason, the laser beam irradiating condition has to be appropriately changed so that the heating temperature of the lens surface (surface temperature) by irradiation of the laser beam becomes substantially equal (uniform) throughout the entire area of the to-be-dyed region.

In the present invention, therefore, for various plastic lenses each having different thicknesses between a peripheral region and a central region, for example, the laser power condition is changed according to the regions to restrain irregular coloring. To be concrete, when a plastic lens having a thickness largely changing from a peripheral region to a central region is to be dyed in a single color throughout the entire area of the to-be-dyed region, the laser power condition is determined as below. The to-be-dyed region is divided into at least two regions; a region (a central region) located in a predetermined range from the center and a region (a peripheral region) located outside the central region. According to whether the region to be irradiated by a laser beam is the central region or the peripheral region, the laser power condition is changed to change at least one of the scanning speed of the laser beam and the irradiation power of the laser beam. For instance, when the central region has a thinner thickness than the peripheral region, the scanning speed of the laser beam on the central region is set faster than on the peripheral region or a power value of the laser beam on the central region is set lower than on the peripheral region. It is to be noted that the central region may be circular or any other shape (e.g., rectangular). In the present embodiment, the central region (rectangular) is determined as a predetermined range (e.g., 30 mm×30 mm) centered at the lens center.

When the laser beam irradiating condition is to be changed according to different regions as above, the laser beam irradiating condition in each region has only to be determined in advance at such a change degree as that a difference in color density (or a difference in transmittance) in the predetermined range of the plastic lens falls within about 10%. For a range for comparison of color density, for example, a range of 30 mm in radius from the lens center can be set as a comparison range. In the case of the difference in color density falling within about 10%, color unevenness is less likely to be visually perceived and thus actual problems hardly occur. Those laser beam irradiating conditions can be experimentally determined by predetermined type of plastic lens, for example.

In the present embodiment, the to-be-dyed surface of a plastic lens is divided into two regions and applied with different laser beam irradiating conditions. As an alternative, a plurality of regions, e.g., three or more, may be set according to changes in thickness and different laser beam irradiating conditions may be determined so that a difference in color density throughout an entire dyeing region falls within about 10%. As another alternative, the laser beam irradiating condition may be changed continuously (including linearly and nonlinearly) according to changes in thickness, not stepwise region setting (condition setting).

According to the present invention, the sublimable dyes are not heated by the laser beam. The laser beam is irradiated to heat the base material (plastic lens) to such an extent as not to melt the surface of the base material, thereby loosening a molecular structure of polymer to allow the dyes to easily permeate therein. By compatibility of the sublimable dyes with the base material, the sublimable dyes are taken and fixed in the base material, and develop color. Accordingly, the laser power, i.e., irradiation energy density per unit area to the surface to be dyed by the laser beam is determined to achieve a temperature that does not melt the plastic lens and that is needed to loosen the molecular structure of the polymer constituting the base material. Such irradiation energy density can be controlled by adjustment of the output power of the laser beam to be emitted from the laser source 33 by the control part 40 and besides by scanning speed or defocusing of the laser beam with respect to the plastic lens. In the case of performing scanning by line-focusing or defocusing the laser beam on the lens surface, one scanning is performed with such irradiation energy as not to cause sublimation of the dyes due to heating. When the dyes are not fixed (not fully fixed) in one scanning, the scanning is performed by displacing the scanning line little by little while repeatedly overlapping the scanning line. This can give irradiation energy necessary for fixation of the dyes to the lens.

In the present embodiment, furthermore, the laser beam is not moved for scanning whereas the lens is moved to perform scanning on the to-be-dyed surface by the laser beam. The invention however is not limited thereto and may be applied to any configurations if only it can relatively scan the laser beam with respect to the lens. For example, a laser beam scanning device consisting of a galvano mirror and others may be used to move the laser beam for scanning with respect to the plastic lens.

The operations of the method of dyeing the plastic lens 10 will be explained below. The plastic lens used in this embodiment is a meniscus lens having a minus power (a negative power) and a thickness that is thinner in a central region than in a peripheral region of the lens.

As shown in FIG. 2, the plastic lens 10 whose surface is applied uniformly with the sublimable dyes is placed on the holder 11 with the surface applied with the sublimable dyes facing up. Subsequently, a $CO_2$ laser beam is irradiated to the dye-applied surface of the plastic lens 10. Since the $CO_2$ laser beam has too strong power, the laser beam is condensed once through the lens 37 and thus defocused on the surface of the plastic lens. Thus, the irradiated beam has an expanded spot with reduced beam density. Furthermore, by using a detecting device not shown, the position of the movable stage 32 moved by the drive mechanism 38 is constantly ascertained by the controller 39. Therefore, the irradiation position of the laser beam with respect to the plastic lens having a known size placed on the holder 11 can be detected.

Figure 3:
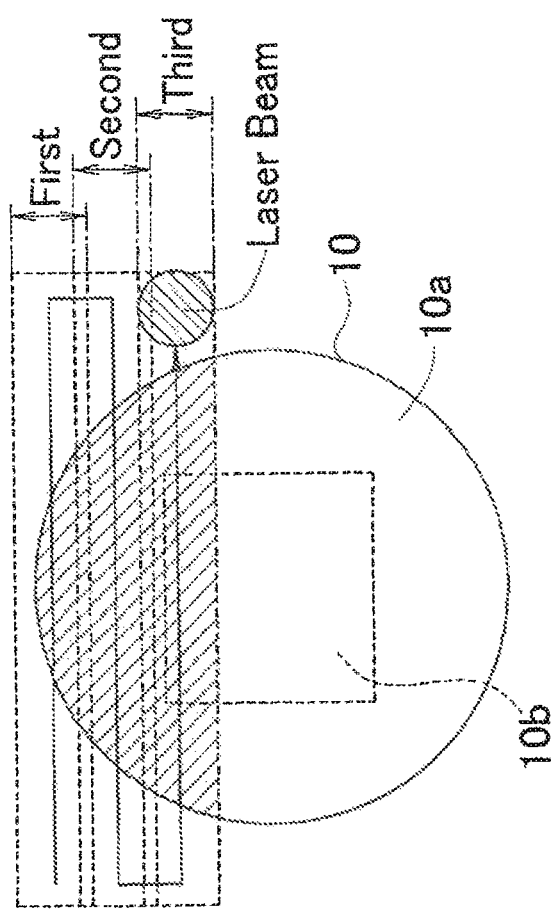
FIG. 3 is a schematic diagram showing relative scanning of a laser beam to a lens.

FIG. 3 shows a scanning method using the laser beam. The plastic lens 10 has a diameter of about 100 mm, a thickness (a material thickness) of 2 mm in a thin portion at and around the lens center and 8 mm in a thick portion in the lens periphery. The surface of the plastic lens 10 is previously applied with the sublimable dyes. In the present embodiment, the peripheral region having a thick thickness is referred to as a first region 10a and the central region having a relatively thin thickness is referred to as a second region 10b. In this embodiment, the central region having a rectangular range of 30 mm×30 mm centered on the lens center is defined as the second region 10b.

The movable stage is moved in X-Y directions (back, forth, left, and right) to perform first scan, turn back for second scan, and then further turn back for third scan as shown in FIG. 3. The second scan is shifted by 2 mm from the first scan in a lateral direction (downward in the drawing sheet). In the case of the spot diameter of the laser beam being 10 mm, for example, the first scan and the second scan overlap by 8 mm. The same applies to subsequent scans. Each scan is conducted to cover the entire area of the plastic lens 10.

While the laser beam is scanning in a range of the first region 10a on the plastic lens 10 (for example, the first scan and the second scan), the controller 39 drives and controls the drive mechanism 38 to achieve a predetermined scanning speed. On the other hand, when the first region 10a and the second region 10b appear on the scanning line as in the third scan, the controller 39 drives and controls the drive mechanism 38 to scan the laser beam on the second region 10b at a faster speed than on the first region 10a.

The laser source 33 is a $CO_2$ laser having a wavelength of 10.2 μm to 10.8 μm. This wavelength corresponds to infrared light. The sublimable dyes hardly absorb this wavelength light. In the present embodiment, the material of the plastic lens 10 is high refractive materials such as a thiourethane material and a thioepoxy material. The material of the plastic lens 10 used in this embodiment absorbs on the order of 50% to 90% of the wavelength of 10.2 to 10.8 μm.

The $CO_2$ laser beam is less likely to be absorbed by the dyes but is absorbed by the plastic lens 10. Accordingly, only the surface of the plastic lens 10 is heated to loosen the molecular structure of polymer that constitutes resin, thereby dispersing the sublimable disperse dyes into the portions in which the molecular structure of polymer is loosened. Thus the disperse dye can be fixed on the surface of the plastic lens 10. Since the scanning speed is controlled to be difference between the regions having different thicknesses, it is possible to keep the fixation of dyes throughout the to-be-dyed surface at the same level and thus restrain the occurrence of color unevenness.

The transparent resin body is a plastic lens having a high refractive index of 1.60 or more. The conventional dyeing method using oven heating could not dye a plastic lens having a refractive index of 1.60 or more made of for example thiourethane resin or thioepoxy resin. Unless such a lens is heated at 140° C. or higher for 2 hours or longer, it could not be dyed in sufficient density. Considering workability, however, dyeing has to be conducted in a short time. A higher temperature of 150° C. or more enables short-time dyeing, but the lens is liable to turn yellow or deformed. To apply the dyes to the lens surface, this embodiment adopts the method of depositing the dyes on the lens by heating the sublimable dyes under vacuum but is not limited thereto. For example, sublimating of the sublimable dyes may be performed under atmospheric pressure to deposit the dyes on the lens surface. Another alternative is to apply the dyes to the lens surface by a spin coat method.

In the embodiment described above, the irradiation condition of the laser beam (e.g., output power and scanning speed of the laser beam) is changed according to the thickness of a lens at an irradiation portion of the laser beam, but not limited thereto. It is only necessary to control irradiation of the laser beam by appropriately changing the irradiation condition of the laser beam so that the heating temperature on the lens by the laser beam is substantially equal or uniform throughout the entire area of the to-be-dyed region. In the present embodiment, the "substantially equal heating temperature" includes variations in heating temperature providing such a degree of color unevenness that is not perceived visually when dyeing in uniform color density is desired. To be concrete, it includes the variations in heating temperature providing the difference in color density (or the difference in transmittance) in a predetermined range on the to-be-dyed surface of the plastic lens falls within about 10%. Other embodiments are explained hereinafter.

Figure 4:
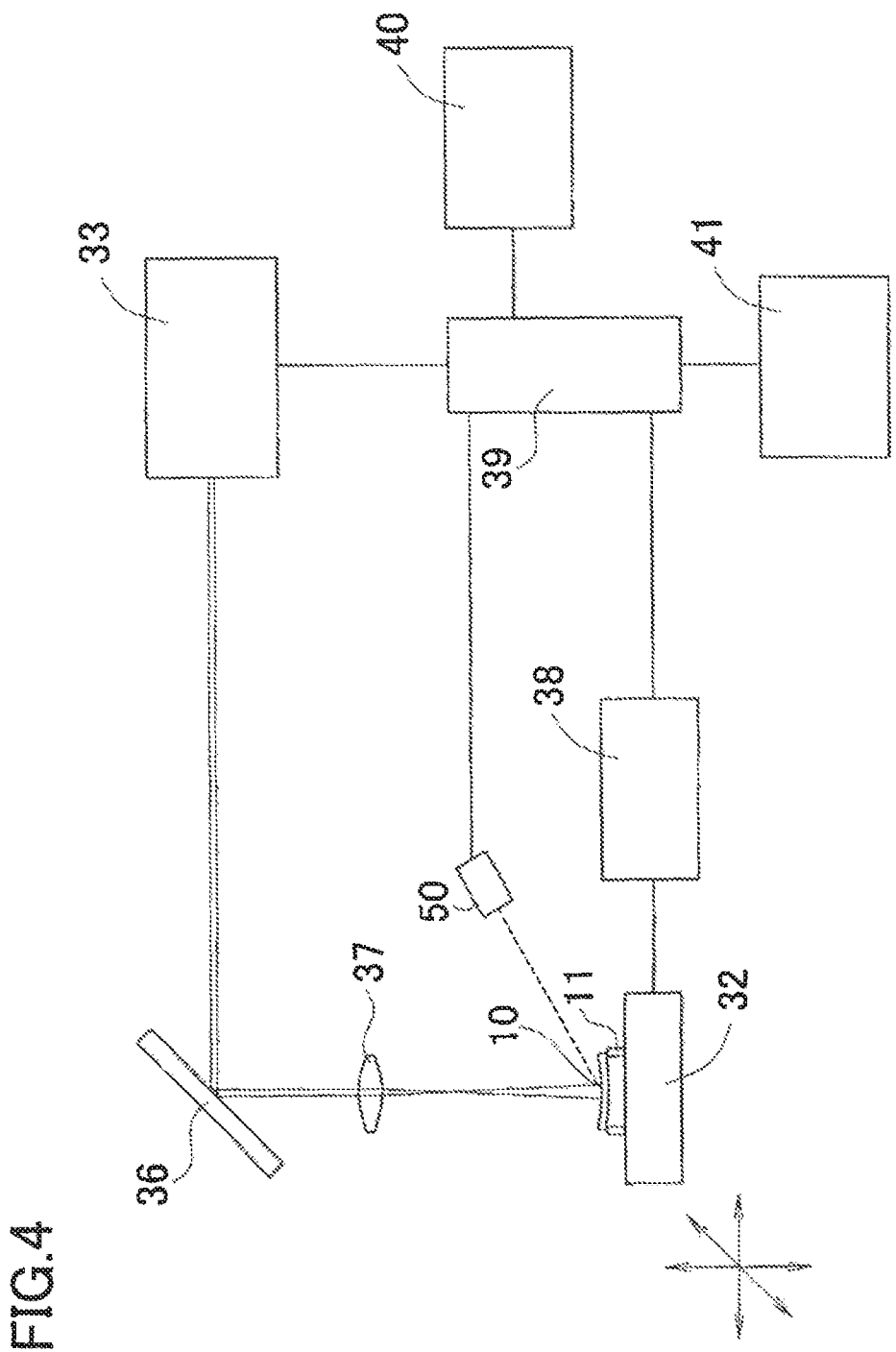
FIG. 4 is a diagram showing a schematic configuration of a dyeing apparatus used in another embodiment.
Figure 5:
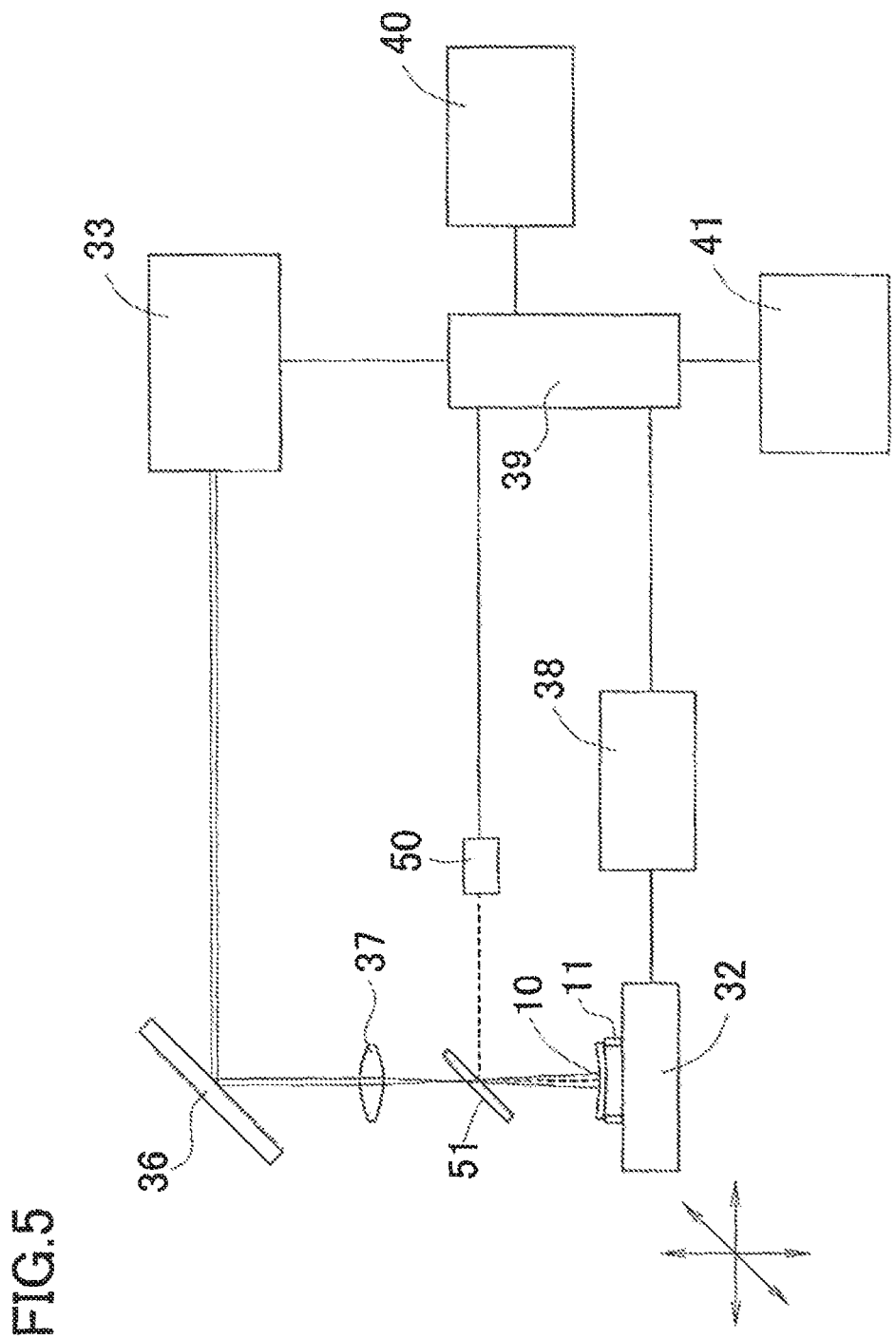
FIG. 5 is a diagram showing a schematic configuration of a dyeing apparatus used in another embodiment.

FIGS. 4 and 5 are schematic diagrams of a dyeing apparatus used in a second embodiment. Parts or components assigned with the same reference signs as those of the dyeing apparatus shown in FIG. 2 have the same functions as those in the dyeing apparatus of the aforementioned embodiment and hence their details are omitted. In FIG. 4, the dyeing apparatus 30 shown in FIG. 2 is additionally provided with a noncontact thermometer 50 serving as a detection device to detect (measure) a heating temperature (a lens surface temperature) of a laser beam at an irradiation position with respect to the lens 10. A suitable example of this noncontact thermometer is a radiation thermometer for determining the temperature of an object by measuring intensity of infrared light and visible light from the object. As illustrated, the noncontact thermometer 50 is placed in such a position as to detect, from obliquely above, the irradiation position (a heating site) of the laser beam on the lens 10. More preferably, the noncontact thermometer 50 is located so that a measurement axis (a dotted line) of the noncontact thermometer and the optical axis of the laser beam intersect at a predetermined angle. The vertical position of the lens 10 is set so that the intersection falls on the lens 10.

The noncontact thermometer 50 is coupled to the controller 39 and transmits a detection result of the heating temperature to the controller 39. Upon receipt of the detection result of the heating temperature, the controller 39 appropriately changes the laser beam irradiating condition to maintain the preset heating temperature in a predetermined range, and controls output power of the laser beam to be emitted from the laser source 33. A target heating temperature is set in advance by use of the control part 40. Setting of the heating temperature is made by taking into account the material of the transparent resin body (herein, the lens), which is an object to be dyed, to set a heating temperature at which dyes can be fixed on the lens 10. The heating temperature is set, even though it depends on the resin materials, to a temperature needed for fixation of the dyes and at which the dyes are less likely to resublime. This heating temperature is preferably set in a range of 100° C. to 200° C. and more preferably in a range of 110° C. to 170° C. A part of the dyes sticking to the lens 10 may sublime depending on the set heating temperature. However, substantially equal heating temperature can be maintained throughout the entire area of the to-be-dyed surface of the lens. Therefore, sublimation of the dyes occurs at almost the same level irrespective of the irradiation positions of the lens, thus preventing the occurrence of color unevenness.

The controller 39 drives the movable stage 32 to ensure sufficient time needed for the dyes to fix to the lens 10 at the heating temperature set in each laser irradiation position on the lens 10. The relative scanning speed of the laser beam provided by the movable stage 32 may be constant irrespective of the set heating temperature and may be set in association with the set heating temperature. The storage part 41 may store in advance a plurality of information on the laser beam irradiating condition to set different heating temperatures and scanning speed according to various resin materials. In this case, the type of a lens (resin material and lens shape) is designated by the control part 40, and a corresponding laser irradiation (e.g., heating temperature and scanning speed) is retrieved (read out) from the storage part 41 and set.

In the present embodiment, the output power of the laser beam to be emitted from the laser source is adjusted to keep the set heating temperature in the predetermined range, but it is not limited thereto. An alternative is to keep the laser power constant but change other laser beam irradiating conditions, for example, by changing a defocused state of the laser beam on the lens by an optical member or irradiating the laser beam in a pulse pattern, to thereby maintain the set heating temperature. In the case where the laser beam irradiating condition is appropriately adjusted based on temperature detection, relative scanning of the laser beam with respect to the lens may be made consistently in a constant direction. When the scanning is always performed in the same direction, the temperature detection condition is set equal as compared with in relative scanning by laser beam reciprocating motion even when the irradiation position of the laser beam is displaced from a temperature detection position. This can more stably detect the heating temperature. When the heating temperature is to be detected obliquely with respect to the irradiation position of the laser beam by the noncontact thermometer, it is preferable to bring the angle of the measurement optical axis of the noncontact thermometer to the measurement position of the lens close to the irradiation angle of the optical axis of the laser beam.

FIG. 5 is a schematic diagram showing an example in which the dyeing apparatus shown in FIG. 4 is arranged so that the measurement axis of the noncontact thermometer 50 is made coaxial with the optical axis of the laser beam. Parts or components assigned with the same reference signs as those in the dyeing apparatus shown in FIG. 2 have the same functions as those in the dyeing apparatus in the aforementioned embodiments and their details are omitted.

On an optical path of the laser beam emitted from the laser source 33, there is provided a mirror 51 to make the measurement axis of the noncontact thermometer 50 coaxial with the optical axis of the laser beam. The set position of the mirror 51 is not particularly limited but is preferably off a focus position of the laser beam to prevent damage to the mirror. In the present embodiment, the mirror 51 is located on the optical path between the focus position of the laser beam by the lens 37 and the lens 10. The mirror 51 is selectable from a dichroic mirror having the property of transmitting a wavelength of the laser beam but reflecting other wavelengths, a half mirror, a laser mirror that highly reflects a specific wavelength, and the like. In the present embodiment, particularly, there is used a dichroic mirror capable of transmitting a wavelength of 10.2 to 10.8 μm which is the wavelength of the laser beam but reflecting a wavelength (e.g., 5 μm) in a measurement band of the noncontact thermometer.

The laser beam emitted from the laser source 33 is focused through the lens 37 and then passes through the mirror 51, and thus the beam in a defocused state falls on the lens 10. When a part of the lens 10 is heated by the laser beam irradiated thereto, infrared radiation is generated. The noncontact thermometer 50 measures the intensity of infrared light of a specific wavelength at a laser beam irradiation point, generated on the lens 10, through the mirror 51 and detects the heating temperature. The controller 39 controls the laser source 33 to sequentially adjust the laser power so that the heating temperature previously set by the control part 40 and the detected heating temperature are substantially equal. The dyeing apparatus with the optical axis of the laser beam and the measurement axis of the noncontact thermometer made coaxial can measure more accurately the heating temperature of the surface of a resin body having a curved surface such as the lens 10.

In the case where reflection light (scattered light) of the laser beam enters the noncontact thermometer and exerts an influence on a detection result of the thermometer, a filter that blocks the wavelength of the laser beam and transmits other wavelengths may be placed in front of the noncontact thermometer.

The above embodiments exemplify the plastic lens as an object to be dyed which is a transparent resin body, but is not limited thereto. Of course, the invention may be applied to a plate-like transparent resin body or other transparent resin bodies having different shapes.

Concrete examples will be explained below.

Example 1

1. Test Conditions:
(1) Application of Dyes to a Plastic Lens Surface: Vapor Deposition Transfer Method
(1-1) Equipment Used:
   Printer: EPSON PX-6250S
   Inks: Nidek, TTS INK RED NK-1
     Nidek, TTS INK YELLOW NK-1
     Nidek, TTS INK BLUE NK-1
   Printing software: Nidek, TTS-PS 1.0
   Vapor deposition transfer device: TTM-1000
(1-2) Printing:
Printing was made on paper for transfer with data shown in Table 1 (Blue) by use of PX-6250S.

TABLE 1

| | Yellow INK | Red INK | Blue INK |
|---|---|---|---|
| Blue | 0 | 0 | 512 |

Each ink has a maximum print amount of 1024 and a half print amount of 512.
(1-3) Vapor Deposition Transfer:

The printed transfer paper and a MR8 lens (S-2.50) were set in a jig and then put in TTM-1000. The transfer work was then conducted under the conditions that: the degree of vacuum was 0.5 kPa, the temperature of the transfer paper was 225° C., and the refractive index of the MR8 lens was 1.60.

(1-4) Laser Irradiation Test:
Experimental Equipment:
Laser: Coherent Inc., GEM-100A
Power of Laser beam: 65 W
Diameter of Laser beam emerging from DP: 3.8 mm
Spot diameter of 35 mm on the plastic lens by setting a distance from a laser condensing lens (f=37.5 mm) to the plastic lens to 390 mm to defocus the laser beam
Scan speed for peripheral region: 33.4 mm/s
Scan speed for central region: 66.8 mm/s, Speed in a lens central range of 30 mm×30 mm
Experiment Method:
A lens applied with the dyes was set on the stage and irradiated with a laser beam by performing control with different scanning speeds between the peripheral region and the central region. The scanning speed is changed based on whether the laser optical axis is located in the peripheral region or the central region.

2. Test Results:
Evaluation was made about coloring of color, damage of a base material surface, and transmittance (color unevenness).

(1) Coloring of Color:
After completion of laser beam irradiation, the lenses were wiped with a cloth saturated with acetone. It was checked whether or not each lens was colored. The lenses were dyed in desired density without loss of color.

(2) Damage of the Base Material Surface:
The surface reflection was checked as to whether or not damages (irregularity caused by melting of base materials) were found in irradiated portions. As a result of checking the lens surfaces dyed in different colors, no damage was found.

(3) Transmittance:
The transmittance was measured at a measurement point corresponding to each position of + or −10 mm, + or −20 mm, and + or −30 mm in a meridian direction with reference to the lens center. A measurement device used is MODEL 304 by Asahi Spectra Co., Ltd. Results of the transmittance are shown in Table 2. Even though the transmittance is different between the measurement points, a difference between them falls within 10%, so that color unevenness could not visually be perceived.

Comparative Example 1

Excepting that the scanning speed (33.4 mm/s) was fixed irrespective of regions of a lens, the test conditions were the same as those in Example 1.

(1) Coloring of Color:
After completion of laser beam irradiation, the lenses were wiped with a cloth saturated with acetone. It was checked whether or not each lens was colored. The lenses were dyed in desired density without loss of color.

(2) Damage of the Base Material Surface:
The surface reflection was checked as to whether or not damages (irregularity caused by melting of base materials) were found in irradiated portions. As a result of checking the lens surfaces dyed in different colors, no damage was found.

(3) Transmittance:
The transmittance was measured as in Example 1. Results thereof are shown in Table 2. Even though the transmittance is different between the measurement points, a difference between them exceeds 10%, so that color unevenness could be visually perceived.

TABLE 2

| | | | Transmittance (%) | | | | | | |
| --- | --- | --- | --- | --- | --- | --- | --- | --- | --- |
| | Coloring | Damage | −30 mm | −20 mm | −10 mm | Center | +10 mm | +20 mm | +30 mm |
| Example 1 | ○ | None | 59.3 | 63.2 | 65.1 | 68.0 | 65.3 | 63.5 | 59.2 |
| Comparative Example 1 | ○ | None | 58.0 | 63.4 | 65.7 | 70.2 | 66.2 | 63.8 | 59.2 |

REFERENCE SIGNS LIST

1 Base body for dyeing
10 Plastic lens
20 Vacuum vapor deposition transfer machine
30 Dyeing device
32 Movable stage
33 Laser source
36 Reflection mirror
38 Drive mechanism
40 Control part
41 Storage part

The invention claimed is:
1. A dyeing method in which a transparent resin body having a surface applied with a dye in a to-be-dyed region of the transparent resin body is heated to fix the dye to the surface of the transparent resin body, the method comprising:
providing a dyeing apparatus comprising:
a laser beam irradiation part configured to irradiate a laser beam toward the transparent resin body;
a scan part configured to relatively scan the laser beam irradiated by the laser beam irradiation part with respect to the transparent resin body; and
a controller connected to the laser beam irradiation part and the scan part, the controller configured to control irradiation of the laser beam by the laser beam irradiation part by changing a laser beam irradiating condition according to a thickness of the transparent resin body at a scanning position with respect to a portion of the transparent resin body to be heated so that an irradiation energy density varies at the surface of the transparent resin body according to the thickness of the transparent resin body so that a heating temperature of the surface of the transparent resin body by irradiation of the laser beam is equal throughout an entire area of the to-be-dyed region of the transparent resin body while the laser beam is being relatively scanned by the scan part with respect to the to-be-dyed region of the transparent resin body, and so that only the surface of the transparent resin body is heated by the laser beam to a temperature required for fixing the dye to the surface of the transparent resin body in the to-be-dyed region of the transparent resin body, wherein the controller controls the laser beam irradiation part based on the laser beam irradiating condition, and wherein the laser beam irradiating condition includes at least one of a relative scanning speed of the laser beam by the scan part and irradiation power of the laser beam by the laser beam irradiation part;

irradiating the laser beam toward the transparent resin body applied with the dye on the surface while relatively scanning the laser beam with respect to the transparent resin body to heat the to-be-dyed region of the transparent resin body to fix the dye to the surface of the transparent resin body in the to-be-dyed region of the transparent resin body; and changing, during said irradiating, the laser beam irradiating condition with respect to the thickness of the transparent resin body at a portion of the transparent resin body to be heated so that the irradiation energy density varies at the surface of the transparent resin body according to the thickness of the transparent resin body so that the heating temperature on the transparent resin body by irradiation of the laser beam is equal throughout the entire area of the to-be-dyed region of the transparent resin body, wherein:

the changing of the laser beam irradiating condition during irradiating, comprises changing the laser beam irradiating condition, while the laser beam is being relatively scanned with respect to the to-be-dyed region of the transparent resin body, between at least (i) a first laser beam irradiating condition for irradiating the laser beam toward a first region in the to-be-dyed region of the transparent resin body and (ii) a second laser beam irradiating condition for irradiating the laser beam toward a second region having a thinner thickness than the first region, the second irradiation condition being different from the first irradiation condition, and the laser beam has a wavelength having a lower absorbance by the dye as compared to an absorbance by the transparent resin body.

2. The dyeing method according to claim 1, wherein the irradiating step comprises detecting a heating temperature on the transparent resin body under irradiation of the laser beam, and the changing step comprises changing the laser beam irradiating condition based on the detection result.

3. The dyeing method according to claim 2, wherein a measurement axis of the heating temperature detection is coaxial with an irradiation optical axis of the laser beam.

4. The dyeing method according to claim 2, wherein the transparent resin body is a plastic lens.

5. The dyeing method according to claim 1, wherein the second laser beam irradiating condition includes at least one of a condition that the scanning speed is set faster than in the first laser beam irradiating condition and a condition that the irradiation power is set lower than in the first laser beam irradiating condition.

6. The dyeing method according to claim 5, wherein the transparent resin body is a plastic lens.

7. The dyeing method according to claim 1, wherein the laser beam irradiation condition is controlled so that the heating temperature is a temperature at which a difference in color density over the to-be-dyed region falls within 10%.

8. The dyeing method according to claim 1, wherein the changing step comprises changing, during the irradiating, the laser beam irradiating condition so that the irradiation energy density varies at the surface of the transparent resin body according to the thickness of the transparent resin body so that the dye is evenly fixed to the surface of the transparent resin body throughout the entire area of the to-be-dyed region of the transparent resin body.

9. A dyeing method in which a transparent resin body having a surface applied with a dye in a to-be-dyed region of the transparent resin body is heated to fix the dye to the surface of the transparent resin body, the method comprising:

providing a dyeing apparatus comprising:

a laser beam irradiation part configured to irradiate a laser beam toward the transparent resin body;

a scan part configured to relatively scan the laser beam irradiated by the laser beam irradiation part with respect to the transparent resin body; and a controller connected to the laser beam irradiation part and the scan part, the controller configured to control irradiation of the laser beam by the laser beam irradiation part by changing a laser beam irradiating condition according to a portion of the transparent resin body to be heated so that a heating temperature of the surface of the transparent resin body by irradiation of the laser beam is equal throughout an entire area of the to-be-dyed region of the transparent resin body while the laser beam is being relatively scanned by the scan part with respect to the to-be-dyed region of the transparent resin body, wherein the controller controls the laser beam irradiation part based on the laser beam irradiating condition, and wherein the laser beam irradiating condition includes at least one of a relative scanning speed of the laser beam by the scan part and irradiation power of the laser beam by the laser beam irradiation part;

irradiating the laser beam toward the transparent resin body applied with the dye on the surface while relatively scanning the laser beam with respect to the transparent resin body to heat the to-be-dyed region of the transparent resin body to fix the dye to the surface of the transparent resin body in the to-be-dyed region of the transparent resin body; and changing, during said irradiating, the laser beam irradiating condition with respect to a thickness of the transparent resin body at the portion of the transparent resin body to be heated so that an irradiation energy density varies at the surface of the transparent resin body according to the thickness of the transparent resin body so that the heating temperature on the transparent resin body by irradiation of the laser beam is equal throughout the entire area of the to-be-dyed region of the transparent resin body, wherein the changing of the laser beam irradiating condition during irradiating comprises changing the laser beam irradiating condition, while the laser beam is being relatively scanned with respect to the to-be-dyed region of the transparent resin body, between at least (i) a first laser beam irradiating condition for irradiating the laser beam toward a first region in the to-be-dyed region of the transparent resin body and (ii) a second laser beam irradiating condition for irradiating the laser beam toward a second region having a thinner thickness than the first region, the second irradiation condition being different from the first irradiation condition, and wherein the irradiating step comprises detecting a heating temperature on the transparent resin body under irradiation of the laser beam, and the changing step comprises changing the laser beam irradiating condition based on the detection result.

10. The dyeing method according to claim 9, wherein the changing step comprises changing, during the irradiating, the laser beam irradiating condition so that the irradiation energy density varies at the surface of the transparent resin body according to the thickness of the transparent resin body so that the dye is evenly fixed to the surface of the transparent resin body throughout the entire area of the to-be-dyed region of the transparent resin body.

11. A dyeing method comprising:
applying a dye to a surface of a base body;
transferring the dye from the surface of the base body to a surface of a transparent resin body in a to-be-dyed region of the transparent body; and
fixing the dye to the surface of the transparent resin body by irradiating a laser beam having a wavelength that is absorbed by the transparent resin body but less absorbed by the dye toward the transparent resin body having the dye transferred to the surface while relatively scanning the laser beam with respect to the transparent resin body to heat the to-be-dyed region of the transparent resin body to fix the dye, and by changing a laser beam irradiating condition, while the laser beam is being relatively scanned with respect to the to-be-dyed region of the transparent resin body, between at least (i) a first laser beam irradiating condition for irradiating the laser beam toward a first region in the to-be-dyed region of the transparent resin body and (ii) a second laser beam irradiating condition for irradiating the laser beam toward a second region in the to-be-dyed region of the transparent resin body that has a thinner thickness than the first region,
wherein the laser beam irradiating condition includes at least one of a relative scanning speed of the laser beam and irradiation power of the laser beam.

12. The dyeing method according to claim 11, wherein the fixing step includes detecting the heating temperature on the transparent resin body under irradiation of the laser beam and changing the laser beam irradiating condition based on the detected temperature.

13. The dyeing method according to claim 11, wherein the fixing step comprises changing, while the laser beam is being relatively scanned with respect to the to-be-dyed region of the transparent resin body, the laser beam irradiating condition so that an irradiation energy density varies at the surface of the transparent resin body so that the dye is evenly fixed to the surface of the transparent resin body throughout an entire area of the to-be-dyed region of the transparent resin body.

14. The dyeing method according to claim 11, wherein the transparent resin body is a plastic lens.

* * * * *